May 22, 1956 W. W. WHITE 2,746,627
OUTBOARD MOTOR CARRIER FOR VEHICLES
Filed Aug. 2, 1955 2 Sheets-Sheet 1

Woodrow W. White
INVENTOR.

BY Clarence A. O'Brien
and Harvey B. Jacobson
Attorneys

May 22, 1956     W. W. WHITE     2,746,627
OUTBOARD MOTOR CARRIER FOR VEHICLES
Filed Aug. 2, 1955     2 Sheets-Sheet 2

Woodrow W. White
INVENTOR.

BY Clarence A. O'Brien
and Harvey B. Jacobson
Attorneys

United States Patent Office 2,746,627
Patented May 22, 1956

2,746,627

OUTBOARD MOTOR CARRIER FOR VEHICLES

Woodrow W. White, De Queen, Ark.

Application August 2, 1955, Serial No. 525,953

6 Claims. (Cl. 214—450)

This invention comprises novel and useful improvements in an outboard motor carrier for vehicles, and more specifically pertains to a device whereby a conventional outboard motor may be securely fastened to a carriage and the latter may be removably supported by an improved bed secured to the top of the motor vehicle.

The principal object of this invention is to provide a device whereby an outboard motor may be safely, easily and quickly mounted for transportation upon the top of a motor vehicle and may be quickly removed therefrom when desired.

A further object of the invention is to provide a mounting attachment for carrying outboard motors upon the tops of vehicles which shall be of a simple and relatively inexpensive construction, and yet which shall rigidly support and secure the outboard motor and its gas tank in fixed position upon a carrier, together with means whereby the carrier may be easily applied to or removed from a supporting bed mounted upon the top of a motor vehicle.

Yet another object is to provide a device in accordance with the foregoing objects wherein improved means are provided associated with the carriage and with the bed which will support, retain and guide the carriage in its positioning upon and its removal from the bed, whereby the carriage with the motor secured fixedly thereto may be held in a vertically inclined position until such time as it is desired to either completely remove the carriage from the bed or to slide the carriage into its resting position upon the bed.

A further important object of the invention is to provide an apparatus in conformity with the above mentioned objects which will enable the carriage and the motor mounted thereon to be easily applied to or withdrawn from the bed from the side of the motor vehicle and by a transversely sliding movement with respect thereto.

And a final important object of the invention to be specifically enumerated herein resides in the provision of a supporting device as set forth in the preceding objects in which the carriage shall be provided with means for fixedly and safely supporting the outboard motor thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a vertical transverse sectional view taken substantially upon the plane indicated by section line 5—5 of Figure 2; and Figure 6 is a detail view in vertical section taken substantially upon the plane indicated by section line 6—6 of Figure 1.

Figure 1:
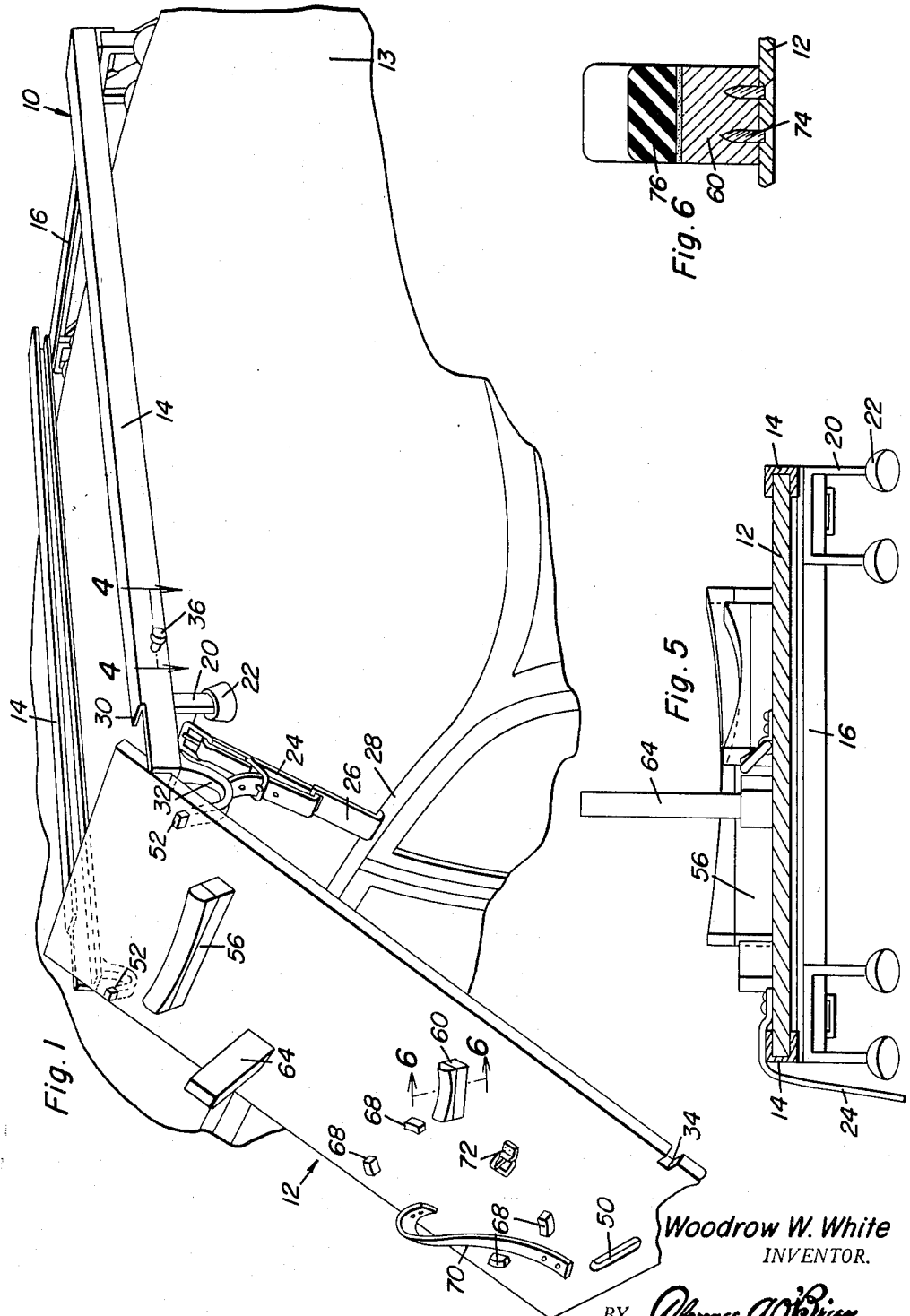
Figure 1 is a fragmentary perspective view of a portion of an automotive vehicle and illustrating the manner in which the outboard motor supporting appliance in accordance with this invention is mounted upon the top of the vehicle, the carriage to which the motor is to be attached being shown hanging from the bed in an inclined vertical position.

Referring first to Figure 1, it will be seen that the numeral 10 designates generally a bed which is adapted to removably receive a carriage indicated at 12, the bed being shown mounted in a transverse portion upon the top portion 12 of a conventional form of motor vehicle.

Referring first to the bed assembly, it will be seen that the latter includes a pair of side rails 14 each of which comprises a channel member and which are rigidly connected together, as by transverse connecting members, one of which is shown at 16. As shown in Figure 1, the bed extends transversely or laterally of the motor vehicle, and is provided with suitable supporting legs 20 provided with suction cups 22 whereby the bed may be fixedly secured to and disposed above the top of the motor vehicle.

In order to further rigidly and detachably secure the bed to the vehicle top, there are provided straps 24 appropriately secured to the bed and provided with hook members 26 adapted to engage beneath the rain gutter or other suitable projection at the top of the vehicle.

Figure 4:
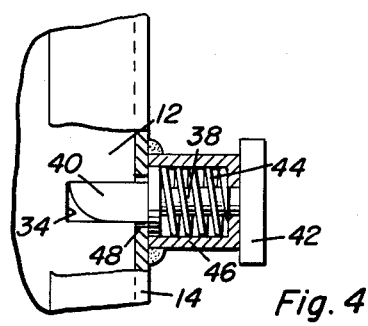
Figure 4 is a detail view taken in horizontal section substantially upon the plane indicated by section line 4—4 of Figure 1.

The channel members 14 are open at one end, and their top flange at that end is cut away, as at 30, for a purpose which will be later apparent. Secured to the notched ends of the channel members are outwardly and downwardly projecting hooks 32 which provide a combined supporting and guiding means for the carriage in a manner to be now described. The carriage 12 comprises a flat elongated plate of any suitable material, whose side edges are adapted to be slidingly received within the channel members 14 whereby the carriage may be supported and retained within the channel members by being slid therein, as will be apparent from Figure 5. When the carriage is slid fully into the channel members, it is locked or latched therein by the provision of a notch or recess 34 provided in one edge of the carriage and which cooperates with a latch plunger 36. As will be best apparent from the detail view of Figure 4, the latch plunger consists of a stem 38 having a latch finger 40 at one end thereof and which is adapted to be removably received within the latching notch 34. At the other end of the stem, there is provided a head 42, a compression spring 44 surrounding the stem and being disposed within a cylindrical housing 46 secured to the side of the channel member 14 in which is provided an aperture 48 which slidably receives the latch finger 40.

At its lower or outer end, the carriage 12 is provided with a hand hold consisting of a slot 50 and at its inner or upper end is provided with a pair of openings 52 which are adapted to be positioned upon the hook 32. The arrangement is such that the carriage may be supported by the insertion of the hooks 32 in the openings 52 to thereby support the carriage and an outboard motor secured thereon as set forth hereinafter, in various vertically inclined positions until such time as it is desired to either lift the carriage into a horizontal position in alignment with the channel members 14, at which time the openings of the carriage will be raised above the hooks 32 and the carriage may then be slid into the channel members into the stored position of the carriage, or, alternatively, the carriage may be lifted from the hooks and removed from the bed. It will thus be seen that the hooks constitute, in cooperation with the openings 52, a carriage supporting and retaining means for supporting the weight of the carriage in a hanging position to facilitate the insertion of the carriage and the outboard motor into the channel members of the bed, and also constitutes a guide means which positions the upward or inner end of the carriage in alignment with the channel members before the engagement of the hooks 32 with the holes 52 is released.

Figure 2:
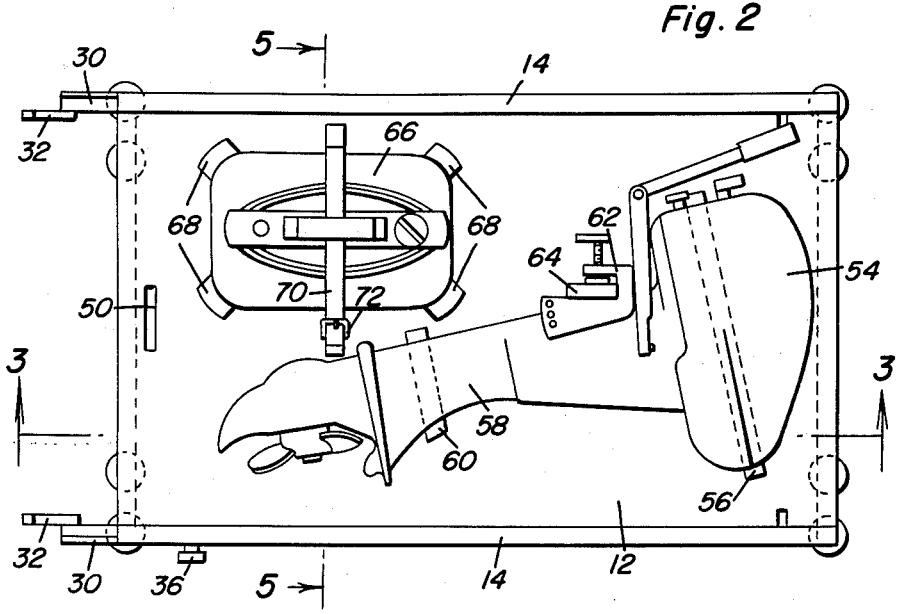
Figure 2 is a top plan view of the carriage showing the manner in which a conventional form of outboard motor is fixedly secured thereon, the carriage being shown mounted in the bed, the top of the automotive vehicle being omitted from this view.
Figure 3:
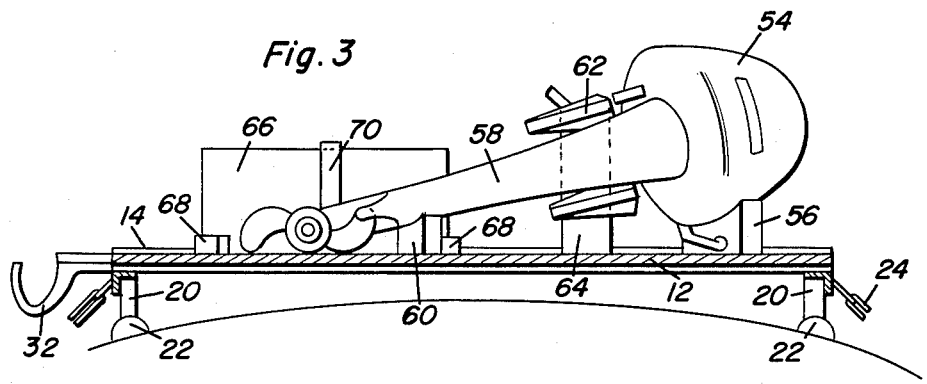
Figure 3 is a vertical transverse sectional view taken substantially upon the plane indicated by the section line 3—3 of Figure 2 but indicating the manner in which the bed is supported upon the top of a motor vehicle.

Referring now especially to Figures 1, 2 and 3, it will be seen that the carriage is particularly adapted to rigidly secure and mount thereon a conventional type of outboard motor. The latter consists of the motor head 54 which is adapted to rest upon a transversely disposed pillow or block 56 and has its propeller shaft housing 58 adapted to rest upon the smaller pillow or block 60. The conventional mounting bracket or clamp 62 of the outboard motor is adapted to embrace an upstanding post or standard 64 and to be clamped thereto, thus rigidly securing the outboard motor in position upon the carriage. When the outboard motor is to be thus stored upon the carriage, the motor gasoline tank 66 is removed and is positioned upon the carriage by being disposed between a plurality of upstanding lugs or projections 68 which thus prevents sliding movement of the gasoline tank upon the carriage. A strap 70 carried by the carriage is adapted to engage a buckle 72 also mounted thereon whereby the gasoline tank may be securely strapped to the carriage.

It is preferred to cushion the upper surfaces of the pillows 56 and 60. Shown in the detail view of Figure 6 is the construction of the pillow 60 and its cushion, it being understood that the same construction may be provided for the pillow 56. As shown in this view, the pillow 60 of any suitable material is secured as by fasteners 74 to the carriage and is provided with a crown or cap or any suitable resilient material, such as rubber or the like, as shown at 76 and which is suitably contoured to receive the corresponding surface of the outboard motor thereon.

From the foregoing, it will be apparent that a conventional type of outboard motor may be quickly and detachably secured to the carriage and will be held in a fixed stationary rigid position thereon. The carriage may then be raised until the openings 52 are received upon the support and guide members 32. The carriage may then be raised to the horizontal position, releasing the apertures 52 from the hooks 32, and causing the front end of the carriage to drop down into the cut away portions 30 of the top flange of the channel members so that the carriage will rest upon the bottom flange of the same and may then be slid easily into the channel members, where it will be locked by the engagement of the latch 36 with the latch notch 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An outboard motor carrier for vehicles comprising a bed including a pair of tracks, means for securing said bed to the top of a vehicle with said tracks disposed transversely thereof, a carriage operatively associated with said track for sliding movement longitudinally thereof, means for securing an outboard motor upon said carriage, a pair of hooks secured to said tracks and having their open ends disposed outwardly and below said tracks, said carriage having openings therein adapted to receive said hooks therein when the carriage is withdrawn from the bed and with only its extremity supported by said track.

2. The combination of claim 1 wherein said tracks comprise channel members having their open sides facing each other for slidably receiving said carriage therein.

3. The combination of claim 1 wherein said tracks comprise channel members having their open sides facing each other for slidably receiving said carriage therein, said channel members having each a recess in its top wall at the end adjacent said hook whereby when the carriage is pivoted vertically upon the hooks into a sharply inclined tilting position the end of the carriage may be vertically removed from its support upon the tracks.

4. The combination of claim 1 wherein said carriage comprises a flat panel.

5. The combination of claim 1 wherein said carriage comprises a flat panel, said carriage including pillows for supporting the head portion and the propeller shaft housing of an outboard motor, a standard on said carriage for engagement by the mounting clamp of an outboard motor.

6. The combination of claim 1 wherein said tracks comprise channel members having their open sides facing each other for slidably receiving said carriage therein, a latch mounted upon the side wall of a channel member and movably projecting therethrough, said carriage having a latching recess in its edge receiving said latch.

References Cited in the file of this patent

UNITED STATES PATENTS

| | | |
|---|---|---|
| 2,551,351 | Swenson | May 1, 1951 |
| 2,686,028 | Johnson | Aug. 10, 1954 |